United States Patent
Hetherington et al.

(10) Patent No.: US 7,401,206 B2
(45) Date of Patent: Jul. 15, 2008

(54) APPARATUS AND METHOD FOR FINE-GRAINED MULTITHREADING IN A MULTIPIPELINED PROCESSOR CORE

(75) Inventors: Ricky C. Hetherington, Pleasanton, CA (US); Gregory F. Grohoski, Austin, TX (US); Robert T. Golla, Round Rock, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 468 days.

(21) Appl. No.: 10/880,488

(22) Filed: Jun. 30, 2004

(65) Prior Publication Data

US 2006/0004995 A1    Jan. 5, 2006

(51) Int. Cl.
  *G06F 9/34* (2006.01)
(52) U.S. Cl. ..................................................... 712/214
(58) Field of Classification Search .................. 712/214
  See application file for complete search history.

(56) References Cited

U.S. PATENT DOCUMENTS

| | | | |
|---|---|---|---|
| 4,845,659 A | 7/1989 | Hrusecky | |
| 4,879,676 A | 11/1989 | Hansen | |
| 5,046,068 A | 9/1991 | Kubo et al. | |
| 5,193,158 A | 3/1993 | Kinney et al. | |
| 5,257,215 A | 10/1993 | Poon | |
| 5,287,508 A * | 2/1994 | Hejna et al. | 718/102 |
| 5,339,266 A | 8/1994 | Hinds et al. | |
| 5,386,375 A | 1/1995 | Smith | |
| 5,488,729 A | 1/1996 | Vegesna et al. | |
| 5,515,308 A | 5/1996 | Karp et al. | |
| 5,546,593 A | 8/1996 | Kimura et al. | |
| 5,548,545 A | 8/1996 | Brashears et al. | |
| 5,559,977 A | 9/1996 | Avnon et al. | |
| 5,619,439 A | 4/1997 | Yu et al. | |
| 5,812,439 A | 9/1998 | Hansen | |
| 5,867,724 A | 2/1999 | McMahon | |
| 5,954,789 A | 9/1999 | Yu et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |

(Continued)

OTHER PUBLICATIONS

Love, Robert. "Kernel Korner: CPU Affiinity" Linux Journal, vol. 2003 issue 11, Jul. 2003.*

(Continued)

*Primary Examiner*—Eddie P Chan
*Assistant Examiner*—Jacob A. Petranek
(74) *Attorney, Agent, or Firm*—Robert C. Kowert; Anthony M. Petro; Meyertons, Hood, Kivlin, Kowert & Goetzel, P.C.

(57) ABSTRACT

An apparatus and method for fine-grained multithreading in a multipipelined processor core. According to one embodiment, a processor may include instruction fetch logic configured to assign a given one of a plurality of threads to a corresponding one of a plurality of thread groups, where each of the plurality of thread groups may comprise a subset of the plurality of threads, to issue a first instruction from one of the plurality of threads during one execution cycle, and to issue a second instruction from another one of the plurality of threads during a successive execution cycle. The processor may further include a plurality of execution units, each configured to execute instructions issued from a respective thread group.

51 Claims, 6 Drawing Sheets

U.S. PATENT DOCUMENTS

| | | | |
|---|---|---|---|
| 6,105,127 | A | 8/2000 | Kimura et al. |
| 6,131,104 | A | 10/2000 | Oberman |
| 6,212,544 | B1 | 4/2001 | Borkenhagen et al. |
| 6,219,778 | B1 | 4/2001 | Panwar et al. |
| 6,243,788 | B1 * | 6/2001 | Franke et al. ............... 711/3 |
| 6,282,554 | B1 | 8/2001 | Abdallah et al. |
| 6,317,840 | B1 | 11/2001 | Dean et al. |
| 6,341,347 | B1 | 1/2002 | Joy et al. |
| 6,349,319 | B1 | 2/2002 | Shankar et al. |
| 6,357,016 | B1 | 3/2002 | Rodgers et al. |
| 6,397,239 | B2 | 5/2002 | Oberman et al. |
| 6,415,308 | B1 | 7/2002 | Dhablania |
| 6,427,196 | B1 | 7/2002 | Adiletta et al. |
| 6,434,699 | B1 | 8/2002 | Jones et al. |
| 6,460,134 | B1 | 10/2002 | Blomgren et al. |
| 6,470,443 | B1 * | 10/2002 | Emer et al. ............... 712/205 |
| 6,496,925 | B1 | 12/2002 | Kota et al. |
| 6,507,862 | B1 * | 1/2003 | Joy et al. ............... 718/107 |
| 6,523,050 | B1 | 2/2003 | Dhablania et al. |
| 6,564,328 | B1 | 5/2003 | Grochowski et al. |
| 6,567,839 | B1 | 5/2003 | Borkenhagen et al. |
| 6,594,681 | B1 | 7/2003 | Prabhu |
| 6,625,654 | B1 | 9/2003 | Wolrich et al. |
| 6,629,236 | B1 | 9/2003 | Aipperspach et al. |
| 6,629,237 | B2 | 9/2003 | Wolrich et al. |
| 6,631,392 | B1 | 10/2003 | Jiang et al. |
| 6,633,895 | B1 | 10/2003 | Bass et al. |
| 6,651,158 | B2 * | 11/2003 | Burns et al. ............... 712/205 |
| 6,668,308 | B2 | 12/2003 | Barroso et al. |
| 6,668,317 | B1 | 12/2003 | Bernstein et al. |
| 6,671,827 | B2 | 12/2003 | Guilford et al. |
| 6,681,345 | B1 | 1/2004 | Storino et al. |
| 6,687,838 | B2 | 2/2004 | Orenstien et al. |
| 6,694,347 | B2 | 2/2004 | Joy et al. |
| 6,694,425 | B1 | 2/2004 | Eickemeyer |
| 6,697,935 | B1 | 2/2004 | Borkenhagen et al. |
| 6,728,845 | B2 | 4/2004 | Adiletta et al. |
| 6,748,556 | B1 | 6/2004 | Storino et al. |
| 6,801,997 | B2 | 10/2004 | Joy et al. |
| 6,820,107 | B1 | 11/2004 | Kawai et al. |
| 6,847,985 | B1 | 1/2005 | Gupta et al. |
| 6,857,064 | B2 | 2/2005 | Smith et al. |
| 6,883,107 | B2 | 4/2005 | Rodgers et al. |
| 6,889,319 | B1 | 5/2005 | Rodgers et al. |
| 6,898,694 | B2 | 5/2005 | Kottapalli et al. |
| 7,035,998 | B1 * | 4/2006 | Nemirovsky et al. ........ 712/215 |
| 7,117,346 | B2 * | 10/2006 | Moyer et al. ............... 712/228 |
| 7,143,412 | B2 * | 11/2006 | Koenen ............... 718/102 |
| 2002/0156999 | A1 | 10/2002 | Eickemeyer et al. |
| 2003/0028759 | A1 | 2/2003 | Prabhu et al. |
| 2004/0059769 | A1 | 3/2004 | Cornea-Hasegan |
| 2006/0179346 | A1 * | 8/2006 | Bishop et al. ............... 714/13 |

OTHER PUBLICATIONS

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Kalla, et al., IBM Power5 Chip: A Dual-Core Multithreaded Processor, IEEE Micro, vol. 24, No. 2, Apr. 2004, pp. 40-47.

Sun Microsystems, "MAJC Architecture Tutorial. White Paper," Sep. 1999, pp. 1-31.

Sun Microsystems, "Introduction to Throughput Computing," Feb. 2003, pp. 1-18.

Kongetira, et al., "Niagara: A 32-Way Multithreaded Sparc Processor," IEEE Micro, vol. 25, No. 2, Apr. 2005, pp. 21-29.

International Search Report and Written Opinion, PCT/US2005/023077, mailed Jan. 20, 2006, 15 pages.

U.S. Appl. No. 10/881,763, filed Jun. 30, 2004.

U.S. Appl. No. 10/880,713, filed Jun. 30, 2004.

* cited by examiner

| Fetch (F) | T0 | T3 | T6 | T2 | T7 | T5 | T1 | T4 |
|---|---|---|---|---|---|---|---|---|
| Cache (C) |  | T0 | T3 | T6 | T2 | T7 | T5 | T1 |
| Pick (P) |  |  | T0 | T3 | T6 | T2 | T7 | T5 |
| Decode (D) |  |  |  | T0 | T3 | T6 | T2 | T7 |
| Execute (E) |  |  |  |  | T0 | T3 | T6 | T2 |
| Memory (M) |  |  |  |  |  | T0 | T3 | T6 |
| Bypass (B) |  |  |  |  |  |  | T0 | T3 |
| Writeback (W) |  |  |  |  |  |  |  | T0 |
| Execution cycle | 0 | 1 | 2 | 3 | 4 | 5 | 6 | 7 |

*FIG. 3*

APPARATUS AND METHOD FOR FINE-GRAINED MULTITHREADING IN A MULTIPIPELINED PROCESSOR CORE

BACKGROUND OF THE INVENTION

1. Field of the Invention

This invention relates to processors and, more particularly, to fine-grained multithreaded execution within a processor.

2. Description of the Related Art

Many conventional processor implementations attempt to increase performance by increasing the number of instructions the processor can concurrently execute from a single execution thread. For example, typical superscalar processor architectures include multiple execution units, such as load/store units, arithmetic logic units, branch processing units, etc. If such a superscalar processor can identify sufficient instruction-level parallelism within a given execution thread, it may correspondingly improve performance by executing those instructions in parallel in the multiple execution units.

However, increasing the amount of parallelism available within a single thread has proven to be a difficult problem. The presence of conditional branches in code creates challenges in predicting which instruction path to issue from, and speeding instruction execution using superscalar techniques offers little benefit if the instructions executed in parallel were fetched from an incorrectly predicted path. Correspondingly, considerable design effort and implementation area are often devoted to branch prediction in superscalar architectures, in order to keep execution units busy.

Though branches may be successfully predicted at least some of the time, predictors are often considerably less useful in resolving the problem of memory latency. Most superscalar processors include local caches to provide rapid access to instructions and data. However, such caches invariably miss, incurring substantial delays as the processor must access more distant caches or system memory to satisfy its memory request. Such delays may effectively stall or starve the conventional single-threaded superscalar processor, such that over time, the average utilization of processor resources is poor relative to the processor's peak throughput capability.

SUMMARY

Various embodiments of an apparatus and method for fine-grained multithreading in a multipipelined processor core are disclosed. According to one embodiment, a processor may include instruction fetch logic configured to assign a given one of a plurality of threads to a corresponding one of a plurality of thread groups, where each of the plurality of thread groups may comprise a subset of the plurality of threads, to issue a first instruction from one of the plurality of threads during one execution cycle, and to issue a second instruction from another one of the plurality of threads during a successive execution cycle. The processor may further include a plurality of execution units, each configured to execute instructions issued from a respective thread group.

According to another embodiment, a processor may include instruction fetch logic configured to fetch a plurality of instructions from a plurality of threads and to concurrently maintain the fetched instructions available for issue. The processor may further include a plurality of execution units configured to execute instructions, and scheduling logic configured to issue a given one of the plurality of instructions to a given execution unit during a given execution cycle, where at least two issued instructions concurrently execute in respective execution units.

According to still another embodiment, an integrated circuit may include a cache memory and a plurality of multithreaded processor cores coupled to the cache memory, where each of the multithreaded processor cores comprises instruction fetch logic configured to issue a first instruction from one of a plurality of threads during one execution cycle and to issue a second instruction from another one of the plurality of threads during a successive execution cycle.

BRIEF DESCRIPTION OF THE DRAWINGS

FIG. 3 is a pipeline diagram illustrating the flow of instructions through one embodiment of a processor core.

Figure 1:
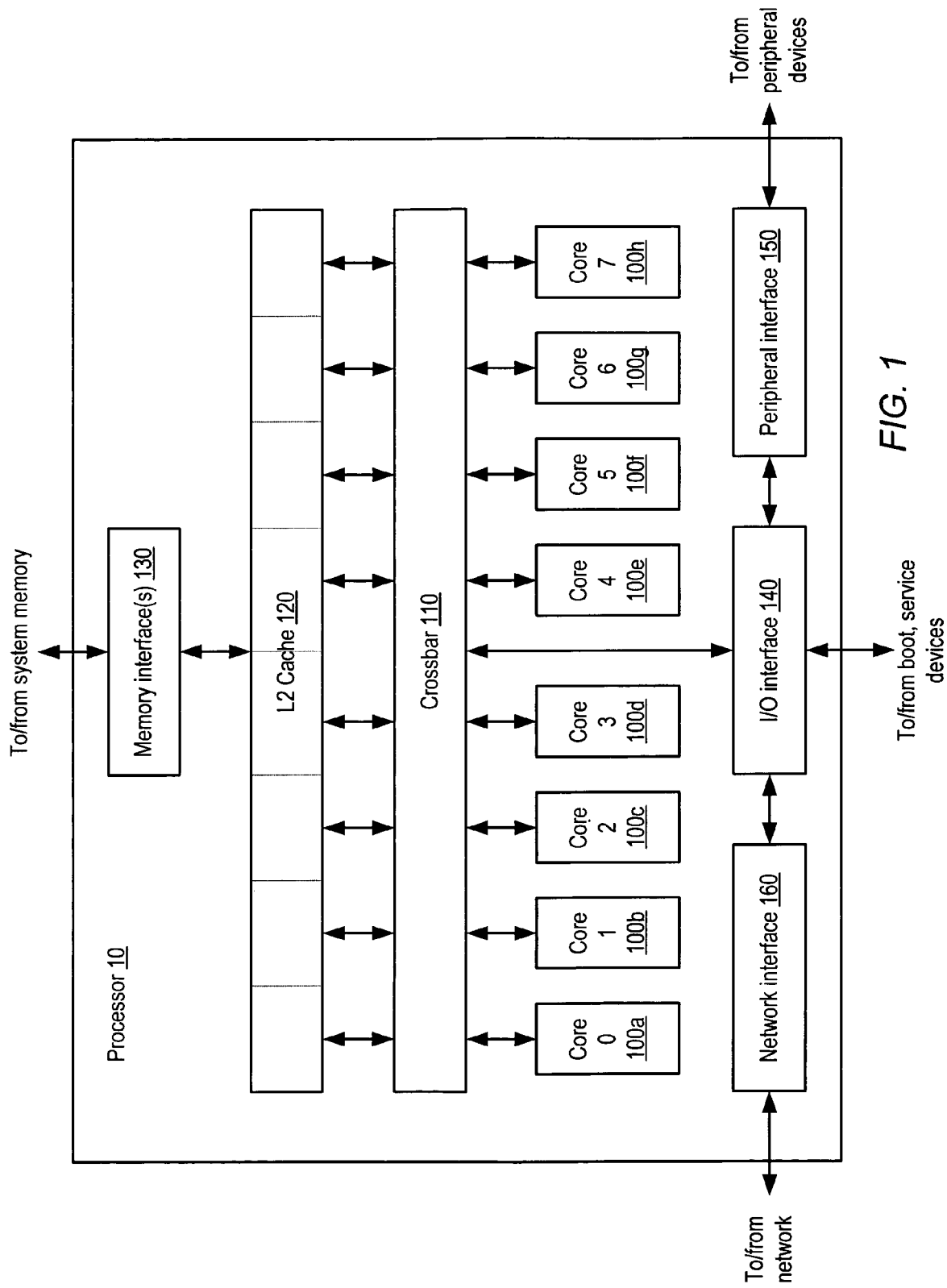
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network. In some embodiments, processor 10 may be implemented on a single integrated circuit.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire™) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Further, in some embodiments of core 100, multiple execution pipelines may be configured to operate concurrently (i.e., core 100 may be "multipipelined").

Figure 2:
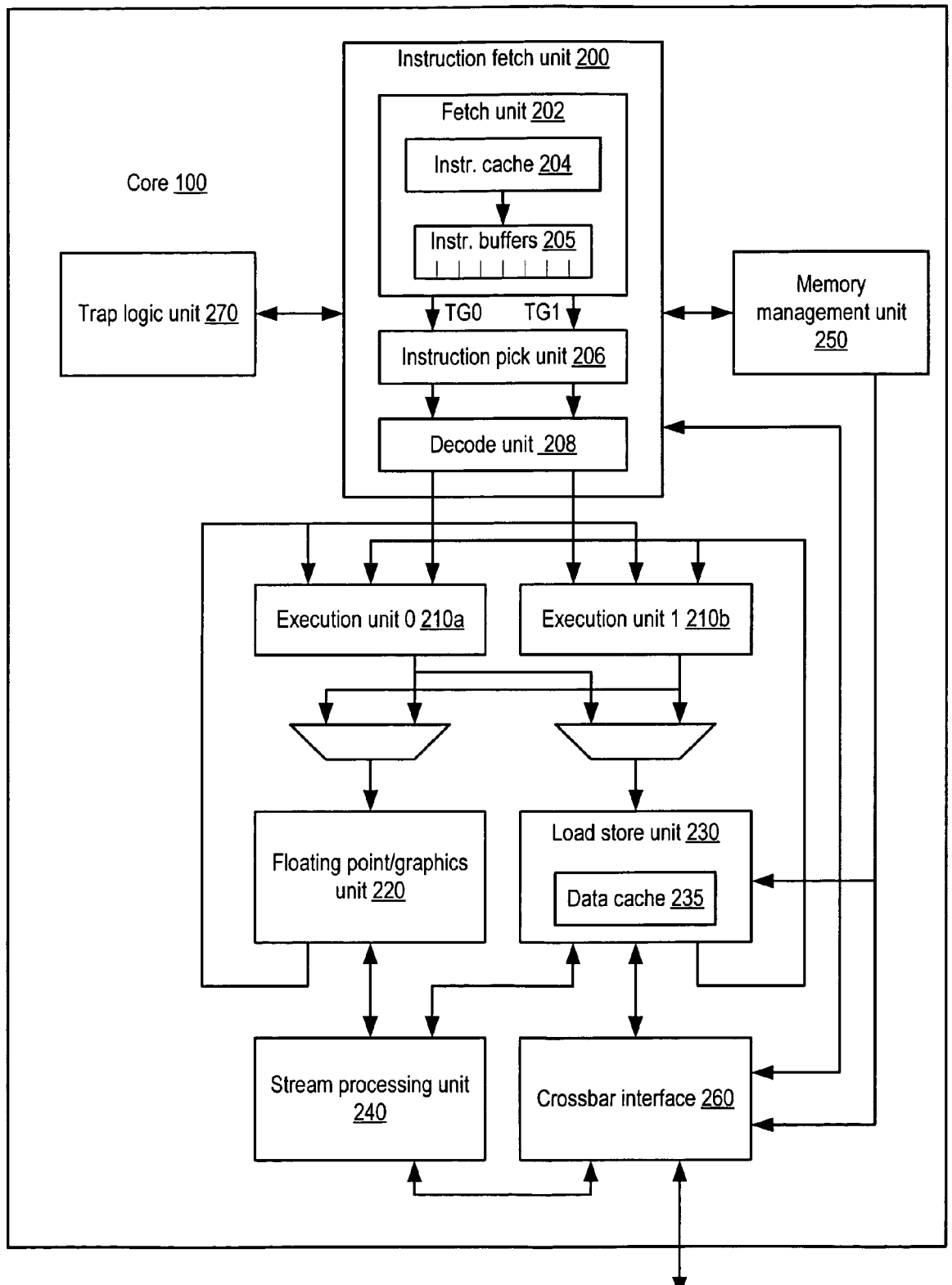
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1. It is noted that any unit that participates in the execution of instructions (e.g., EXUs 210, FGU 220, LSU 230 and/or SPU 240) may be generically referred to as an execution unit.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. However, it is contemplated that any of the techniques or features attributed to illustrated elements of IFU 200 may also be generically attributed to IFU 200, and that IFU 200 may be differently partitioned or organized in other embodiments.

In one embodiment, fetch unit 202 may include logic to maintain separate fetch addresses corresponding to each thread being executed by core 100, and to coordinate the retrieval of instructions from instruction cache 204 according to those fetch addresses. For example, fetch unit 202 may be configured to maintain a plurality of discrete program counters corresponding respectively to each implemented thread, and to derive a thread fetch address from a respective program counter. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structures, for example.

In one embodiment, fetch unit 202 may be configured to concurrently maintain a pool of fetched, ready-for-issue instructions drawn from among each of the threads being executed by core 100. In the illustrated embodiment, fetch unit 202 includes a plurality of instruction buffers 205, where each instruction buffer corresponds to a respective one of the threads core 100 is concurrently capable of executing. For example, in embodiments where core 100 is configured to concurrently execute eight threads, instruction buffers 205 may include eight corresponding buffers. In some embodiments, each of instruction buffers 205 may be configured to store one or more instructions fetched from a respective thread before those instructions are issued for execution, and multiple buffers may concurrently store instructions from their respective threads. For example, in some embodiments fetch unit 202 may be configured to concurrently fetch several instructions from a given thread when it is possible to do so (e.g., if the fetch hits in instruction cache 204 and the fetch pattern is sequential, or under other suitable conditions). By buffering multiple fetched instructions from a given thread within instruction buffers 205, maintaining instructions from the given thread available for issue may be decoupled from the fetch process, such that instructions from the given thread may be able to issue from instruction buffers 205 independently of whether the given thread is currently being fetched from instruction cache 204.

The threads implemented by core 100 may be divided into several thread groups in some embodiments, where each thread group may be a subset of the implemented threads. In the illustrated embodiment, IFU 200 may be configured to assign a given thread to one of two illustrated thread groups denoted TG0 and TG1. In one embodiment, this assignment may be made statically; that is, thread group membership may not change over time. For example, in an embodiment of core 100 implementing eight threads, IFU 200 may statically assign threads 0-3 to TG0 and threads 4-7 to TG1. In another embodiment, assignment of threads to thread groups may be dynamic; that is, IFU 200 may assign a thread to a given thread group and may subsequently reassign that thread to a different thread group. For example, in embodiments where execution resources are associated with particular thread groups as described below, IFU 200 may be configured to reassign threads to different thread groups to facilitate scheduling and resource utilization. It is contemplated that in various embodiments, an arbitrary number of thread groups may be employed, and that thread groups need not include identical numbers of threads.

Pick unit 206 may be configured to select one or more previously fetched instructions to be issued for execution. In the illustrated embodiment, pick unit 206 may be configured to attempt to select one instruction for execution from each thread group (i.e., TG0 and TG1) out of instruction buffers 205, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another.

In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more or fewer than two instructions for execution in a given execution cycle, or may select instructions from all threads rather than specific groups of threads. For example, in one embodiment, pick unit 206 may be configured to select instructions for issue from among all threads and to dynamically assign selected instructions to particular thread groups. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution and to issue instructions to appropriate execution units. In the illustrated embodiment, decode unit 208 may be configured to identify the specific type of a given instruction, such as whether the instruction is an integer, floating point, load/store, or other type of instruction, as well as to identify operands required by the given instruction. Decode unit 208 may take type information as well as thread group information into account when issuing instructions; for example, decode unit 208 may issue integer instructions from a particular thread group to an EXU 210 associated with that thread group as described below. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Figure 7:
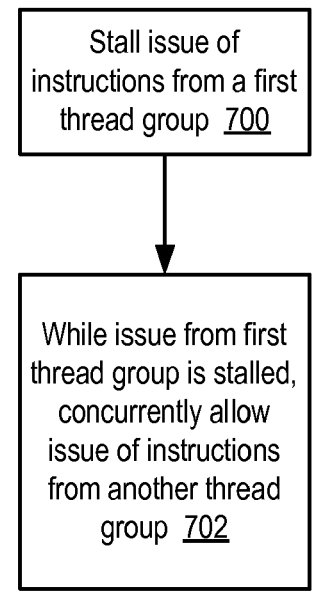
FIG. 7 is a flow diagram illustrating one embodiment of instruction-stalling operation of instruction fetch logic of a fine-grained multithreaded processor core.
Figure 8:
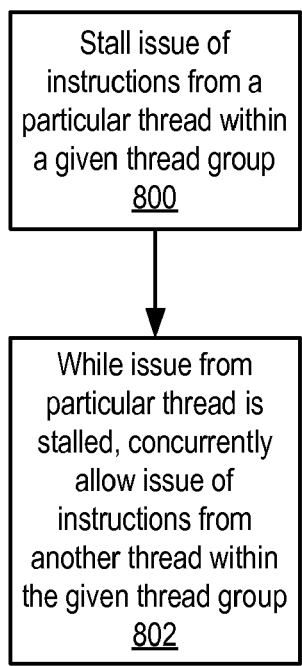
FIG. 8 is a flow diagram illustrating another embodiment of instruction-stalling operation of instruction fetch logic of a fine-grained multithreaded processor core.

Pick unit 206 and decode unit 208, in the illustrated embodiment, may collectively participate in the scheduling and issuance of instructions for execution, and may collectively be referred to as scheduling logic. In other embodiments, the task of instruction scheduling (e.g., detecting hazards and dependencies, either before or after selecting threads from which to issue instructions) may be divided differently among these or other functional units, or implemented in a single functional unit. As shown in FIG. 7 in some embodiments employing thread groups, issue of instructions from any thread in a particular thread group may be stalled by IFU 200. For example, an entire thread group may be stalled (block 700) due to a pipeline hazard, such as a potential writeback conflict between a shorter-latency instruction and a longer-latency instruction within the thread group. In some such embodiments, IFU 200 may concurrently allow issue of instructions from a thread group other than the stalling thread group to proceed (block 702). Also, in some embodiments, issue of instructions from a particular thread may be stalled. For example, a particular thread may experience a load miss, and may consequently stall until load data is returned from off-core. In some such embodiments, IFU 200 may allow issue of instructions from threads other than the stalling thread to proceed. For example, as shown in FIG. 8, in embodiments employing thread groups, if a particular thread in a given thread group stalls, IFU 200 may stall issue of instructions from the particular thread (block 800) and may concurrently allow instructions from any other non-stalled thread in the given thread group to issue (block 802). It is contemplated that in a fine-grained multithreaded embodiment of core 100, IFU 200 may be configured to issue an instruction from a first thread during one execution cycle, and to issue another instruction from a second thread during a successive execution cycle, such that back-to-back instructions in the execution pipeline may correspond to different threads, as described in greater detail below in conjunction with the description of FIG. 3.

Figure 9:
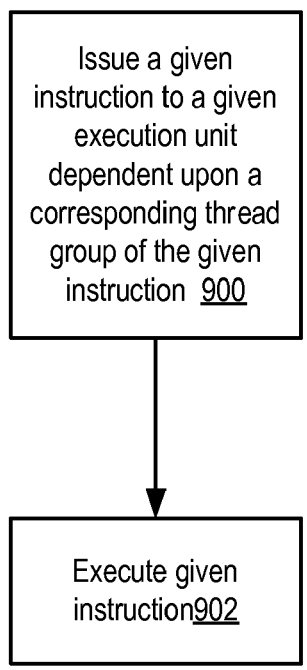
FIG. 9 is a flow diagram illustrating one embodiment of instruction-issue operation of instruction fetch logic of a fine-grained multithreaded processor core.

Execution units 210*a-b* may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210*a* may be configured to execute integer instructions issued from TG0, while EXU1 210*b* may be configured to execute integer instructions issued from TG1. As described above and shown in FIG. 9, in one embodiment, IFU 200 (e.g., via pick unit 206 and/or decode unit 208) may be configured to issue a given instruction to a given execution unit dependent upon a corresponding thread group of the given instruction (block 900). The given execution unit may then execute the given instruction (block 902). For example, IFU 200 may issue instructions from TG0 to EXU0 210*a*, and may issue instructions from TG1 to EXU1 210*b*. In one embodiment, EXUs 210*a-b* may be configured to concurrently execute instructions issued from their respective thread groups in a superscalar fashion. Such concurrently-executed instructions may be from different threads or, in embodiments where EXUs 210 are not bound to specific thread groups, from the same thread. Further, each of EXUs 210 may include an integer register file or another type of storage configured to store register state information for all threads in its respective thread group. In one embodiment, a distinct set of registers may be provided for each thread within its respective EXU 210. For example, if core 100 implements eight threads 0-7 where threads 0-3 are bound to TG0 and threads 4-7 are bound to TG1 1, EXU0 210*a* may provide register state storage for each of threads 0-3 while EXU1 210*b* may provide register state storage for each of threads 4-7.

In some embodiments, distinct register state storage for each of the implemented threads may be provided externally to EXUs 210.

It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described.

Finally, in the illustrated embodiment instructions destined for functional units such as FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions. Additionally, some of the execution pipelines may be configured to operate concurrently. For example, in one embodiment core 100 may be configured to execute an integer and a floating-point instruction concurrently, or an integer and a load/store instruction concurrently.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Figure 4:
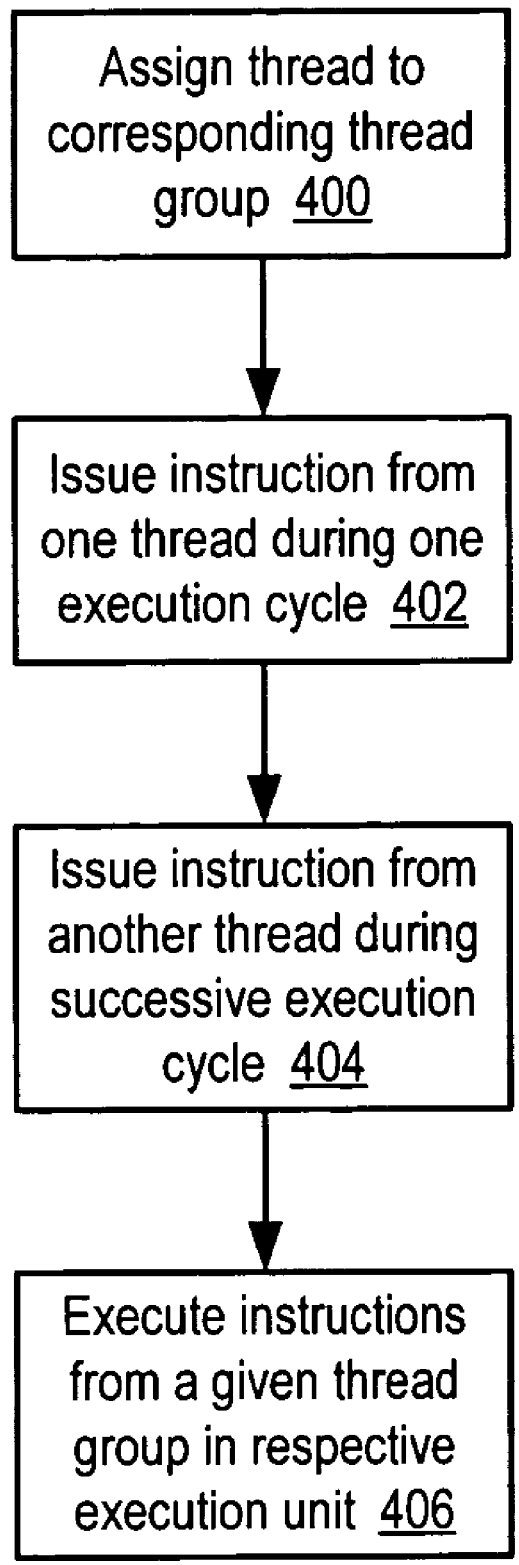
FIG. 4 is a flow diagram illustrating one embodiment of operation of a fine-grained multithreaded processor core.
Figure 10:
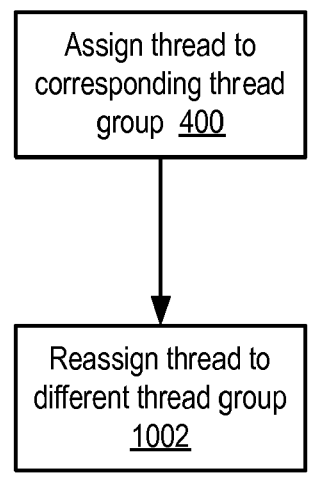
FIG. 10 is a flow diagram illustrating one embodiment of thread-group-reassignment operation of instruction fetch logic of a fine-grained multithreaded processor core.

One embodiment of a method of operation of a fine-grained multithreaded core configured to implement thread groups, such as core 100, is illustrated in FIG. 4. Referring collectively to FIG. 1 through FIG. 4, operation begins in block 400 where a given thread is assigned to a corresponding thread group. As described above, in some embodiments several thread groups may be defined as subsets of the threads implemented by core 100. Further, in some embodiments thread group assignment may occur statically, while in other embodiments such as shown in FIG. 10, a thread may be reassigned to a different thread group (block 1002) after originally being assigned to a given thread group (block 400). In one embodiment, thread group assignment may be performed by IFU 200 as described above.

An instruction from one thread is issued during one execution cycle (block 402), and an instruction from another thread is issued during a successive execution cycle (block 404). In some embodiments, the issued instructions may execute back-to-back in a multistage execution pipeline such as illustrated above. In some embodiments, instruction issue may occur subsequent to thread group assignment. However, in other embodiments, it is contemplated that thread group assignment may occur subsequent to instruction issue. For example, in one embodiment thread group assignment or reassignment may occur during instruction execution.

Following issue, instructions issued from a given thread group execute in a respective execution unit (block 406). For example, in the embodiment illustrated in FIG. 2 and described above, instructions issued from TG0 may be configured to execute in EXU0 210a, while instructions issued from TG1 may be configured to execute in EXU1 210b. In other embodiments, a different number of thread groups may be employed and assigned to different types of execution units.

Figure 5:
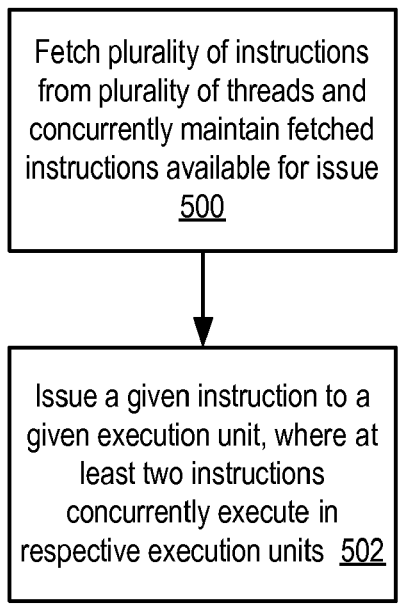
FIG. 5 is a flow diagram illustrating another embodiment of operation of a fine-grained multithreaded processor core.

Another embodiment of a method of operation of a fine-grained multithreaded core, such as core 100, is illustrated in FIG. 5. Referring collectively to FIG. 1 through FIG. 3 and FIG. 5, operation begins in block 500 where a plurality of instructions from a plurality of threads are fetched and concurrently maintained available for issue. For example, in one embodiment IFU 200 may be configured to fetch instructions from multiple threads and to concurrently store those fetched instructions in instruction buffers 205 corresponding to the multiple threads.

Subsequently, a given one of the fetched instructions is issued to one of a plurality of execution units during a given execution cycle, where at least two instructions concurrently execute in respective execution units (block 502). For example, in one embodiment IFU 200 may be configured to concurrently issue instructions from two different thread groups to two different execution units EXU 210a-b, where both execution units execute concurrently in a superscalar fashion, as described above. In another embodiment, IFU 200 may be configured to issue instructions from different threads during successive execution cycles, and execution of these issued instructions may overlap within the execution pipeline, as described above.

Exemplary System Embodiment

Figure 6:
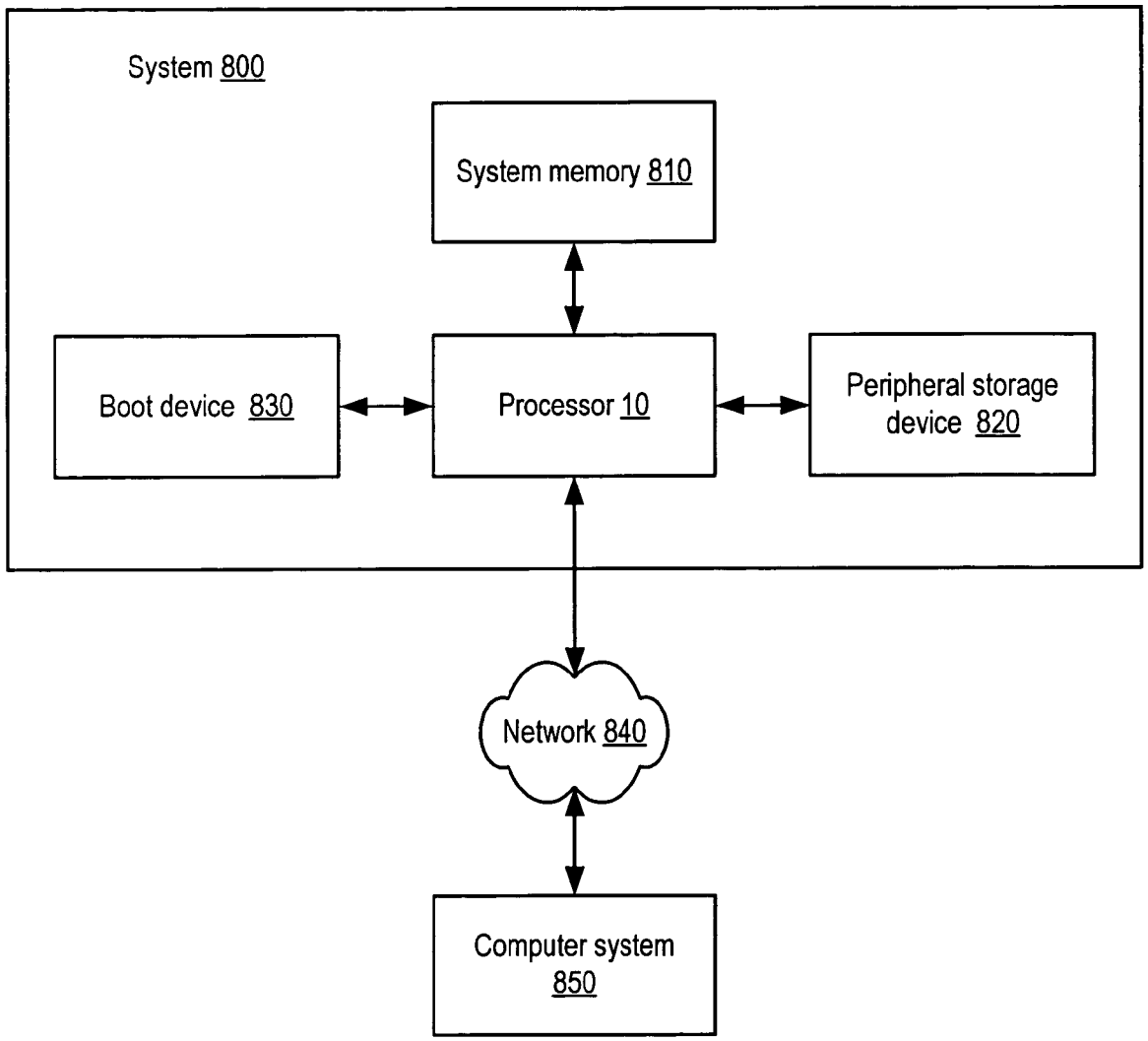
FIG. 6 is a block diagram illustrating one embodiment of a system including a multithreaded processor.

As described above, in some embodiments processor 10 of FIG. 1 may be configured to interface with a number of external devices. One embodiment of a system including processor 10 is illustrated in FIG. 6. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
instruction fetch logic configured to assign a given one of a plurality of threads to a corresponding one of a plurality of thread groups, wherein each of said plurality of thread groups comprises at least two of said plurality of threads, to issue a first instruction from one of said plurality of threads during one execution cycle, and to issue a second instruction from another one of said plurality of threads during a successive execution cycle; and
a plurality of execution units, each configured to execute instructions issued from a respective thread group;
wherein said instruction fetch logic is further configured to reassign said given thread to a different thread group subsequent to assigning said given thread to said corresponding thread group.

2. The processor as recited in claim 1, wherein said execution units are further configured to concurrently execute instructions issued from respective thread groups.

3. The processor as recited in claim 1, wherein said instruction fetch logic is further configured to stall issue of instructions from a first one of said plurality of thread groups while concurrently allowing issue of instructions from a second one of said plurality of thread groups.

4. The processor as recited in claim 1, wherein said instruction fetch logic is further configured to stall issue of instructions from a first thread within a given one of said plurality of thread groups while concurrently allowing issue of instructions from a second thread within said given thread group.

5. The processor as recited in claim 1, wherein said instruction fetch logic is further configured to concurrently issue an instruction from each of two thread groups during a given execution cycle.

6. A method, comprising:
assigning a given one of a plurality of threads to a corresponding one of a plurality of thread groups, wherein each of said plurality of thread groups comprises at least two of said plurality of threads;
issuing a first instruction from one of said plurality of threads during one execution cycle and issuing a second instruction from another one of said plurality of threads during a successive execution cycle; and
executing instructions issued from a given one of said thread groups in a respective execution unit; and
reassigning said given thread to a different thread group subsequent to assigning said given thread to said corresponding thread group.

7. The method as recited in claim 6, further comprising concurrently executing instructions from said plurality of thread groups in a respective plurality of execution units.

8. The method as recited in claim 6, further comprising stalling issue of instructions from a first one of said plurality of thread groups while concurrently allowing issue of instructions from a second one of said plurality of thread groups.

9. The method as recited in claim 6, further comprising stalling issue of instructions from a first thread within a given one of said plurality of thread groups while concurrently allowing issue of instructions from a second thread within said given thread group.

10. The method as recited in claim 6, further comprising concurrently issuing an instruction from each of two thread groups during a given execution cycle.

11. A system, comprising:
a system memory; and
a processor coupled to said system memory, wherein said processor comprises:
instruction fetch logic configured to assign a given one of a plurality of threads to a corresponding one of a plurality of thread groups, wherein each of said plurality of thread groups comprises at least two of said plurality of threads, to issue a first instruction from one of said plurality of threads during one execution cycle, and to issue a second instruction from another one of said plurality of threads during a successive execution cycle; and
a plurality of execution units, each configured to execute instructions issued from a respective thread group;
wherein said instruction fetch logic is further configured to reassign said given thread to a different thread group subsequent to assigning said given thread to said corresponding thread group.

12. The system as recited in claim 11, wherein said execution units are further configured to concurrently execute instructions issued from respective thread groups.

13. The system as recited in claim 11, wherein said instruction fetch logic is further configured to stall issue of instructions from a first one of said plurality of thread groups while concurrently allowing issue of instructions from a second one of said plurality of thread groups.

14. The system as recited in claim 11, wherein said instruction fetch logic is further configured to stall issue of instructions from a first thread within a given one of said plurality of thread groups while concurrently allowing issue of instructions from a second thread within said given thread group.

15. The system as recited in claim 11, wherein said instruction fetch logic is further configured to concurrently issue an instruction from each of two thread groups during a given execution cycle.

16. A processor, comprising:
instruction fetch logic configured to fetch a plurality of instructions from a plurality of threads, to assign a given one of said plurality of threads to a corresponding one of a plurality of thread groups, and to concurrently maintain said fetched instructions available for issue within said plurality of thread groups, wherein each of said plurality of thread groups comprises at least two of said plurality of threads;
a plurality of execution units configured to execute instructions; and scheduling logic configured to issue a given one of said plurality of instructions to a given execution unit during a given execution cycle dependent upon a corresponding thread group of said given instruction, wherein each of said plurality of execution units is bound to a respective one of said plurality of thread groups such that instructions from each given thread group are executed only by a respectively corresponding execution unit;

wherein at least two issued instructions concurrently execute in respective ones of said execution units.

17. The processor as recited in claim 16, wherein said scheduling logic is further configured to issue a first instruction from one of said plurality of threads during a first execution cycle, and to issue a second instruction from another of said plurality of threads during a successive execution cycle.

18. The processor as recited in claim 16, wherein said instruction fetch logic comprises a plurality of instruction buffers corresponding respectively to said plurality of threads, and wherein each of said plurality of instruction buffers is configured to store one or more fetched instructions before said stored fetched instructions are issued by said scheduling logic.

19. The processor as recited in claim 16, wherein said at least two issued instructions correspond respectively to distinct ones of said plurality of threads.

20. The processor as recited in claim 16, wherein said instruction fetch logic is further configured to maintain a plurality of distinct fetch addresses corresponding respectively to said plurality of threads.

21. The processor as recited in claim 16, further comprising distinct register state storage corresponding to each of said plurality of threads.

22. The processor as recited in claim 16, wherein said scheduling logic is further configured to concurrently issue two instructions from a given thread to one or more of said execution units during said given execution cycle.

23. A method, comprising:
fetching a plurality of instructions from a plurality of threads and concurrently maintaining said fetched instructions available for issue within a plurality of thread groups, wherein each of said plurality of thread groups comprises at least two of said plurality of threads;
assigning, during the fetching step, a given one of said plurality of threads to a corresponding one of said plurality of thread groups; and
issuing a given one of said plurality of instructions to a given one of a plurality of execution units during a given execution cycle dependent upon a corresponding thread group of said given instruction, wherein each of said plurality of execution units is bound to a respective one of said plurality of thread groups such that instructions from each given thread group are executed only by a respectively corresponding execution unit;
wherein at least two issued instructions concurrently execute in respective ones of said execution units.

24. The method as recited in claim 23, further comprising issuing a first instruction from one of said plurality of threads during a first execution cycle, and issuing a second instruction from another of said plurality of threads during a successive execution cycle.

25. The method as recited in claim 23, further comprising storing said fetched instructions in a plurality of instruction buffers corresponding respectively to said plurality of threads before issuing said fetched instructions.

26. The method as recited in claim 23, wherein said at least two issued instructions correspond respectively to distinct ones of said plurality of threads.

27. The method as recited in claim 23, further comprising maintaining a plurality of distinct fetch addresses corresponding respectively to said plurality of threads.

28. The method as recited in claim 23, further comprising storing register state information corresponding to each of said plurality of threads.

29. The method as recited in claim 23, further comprising concurrently issuing two instructions from a given thread to one or more of said execution units during said given execution cycle.

30. A system, comprising:
a system memory; and
a processor coupled to said system memory, wherein said processor comprises:
instruction fetch logic configured to fetch a plurality of instructions from a plurality of threads, to assign a given one of said plurality of threads to a corresponding one of a plurality of thread groups, and to concurrently maintain said fetched instructions available for issue within said plurality of thread groups, wherein each of said plurality of thread groups comprises at least two of said plurality of threads;
a plurality of execution units configured to execute instructions; and
scheduling logic configured to issue a given one of said plurality of instructions to a given execution unit during a given execution cycle dependent upon a corresponding thread group of said given instruction, wherein each of said plurality of execution units is bound to a respective one of said plurality of thread groups such that instructions from each given thread group are executed only by a respectively corresponding execution unit;
wherein at least two issued instructions concurrently execute in respective ones of said execution units.

31. The system as recited in claim 30, wherein said scheduling logic is further configured to issue a first instruction from one of said plurality of threads during a first execution cycle, and to issue a second instruction from another of said plurality of threads during a successive execution cycle.

32. The system as recited in claim 30, wherein said instruction fetch logic comprises a plurality of instruction buffers corresponding respectively to said plurality of threads, and wherein each of said plurality of instruction buffers is configured to store one or more fetched instructions before said stored fetched instructions are issued by said scheduling logic.

33. The system as recited in claim 30, wherein said at least two issued instructions correspond respectively to distinct ones of said plurality of threads.

34. The system as recited in claim 30, wherein said instruction fetch logic is further configured to maintain a plurality of distinct fetch addresses corresponding respectively to said plurality of threads.

35. The system as recited in claim 30, wherein said processor further comprises distinct register state storage corresponding to each of said plurality of threads.

36. The system as recited in claim 30, wherein said scheduling logic is further configured to concurrently issue two instructions from a given thread to one or more of said execution units during said given execution cycle.

37. An integrated circuit, comprising:
a cache memory; and
a plurality of multithreaded processor cores coupled to said cache memory;
wherein each of said multithreaded processor cores comprises instruction fetch logic configured to assign a given one of a plurality of threads to a corresponding one of a plurality of thread groups, wherein each of said plurality of thread groups comprises at least two of said plurality of threads, and wherein said instruction fetch logic is further configured to issue a first instruction from one of said plurality of threads during one execution cycle and to issue a second instruction from another one of said plurality of threads during a successive execution cycle; and wherein said instruction fetch logic is further configured to reassign said given thread to a different thread group subsequent to assigning said given thread to said corresponding thread group.

38. The integrated circuit as recited in claim 37, wherein during a given execution cycle, a plurality of instructions from at least two distinct ones of said plurality of threads are concurrently executing in a given multithreaded processor core.

39. The integrated circuit as recited in claim 37, wherein each multithreaded processor core further comprises a plurality of execution units, and wherein said instruction fetch logic is further configured to issue a given instruction to a given execution unit dependent upon a corresponding thread group of said given instruction.

40. The integrated circuit as recited in claim 37, wherein said instruction fetch logic is further configured to stall issue of instructions from a first one of said plurality of thread groups while concurrently allowing issue of instructions from a second one of said plurality of thread groups.

41. The integrated circuit as recited in claim 37, wherein said instruction fetch logic is further configured to stall issue of instructions from a first thread within a given one of said plurality of thread groups while concurrently allowing issue of instructions from a second thread within said given thread group.

42. A system, comprising:
a system memory; and
a processor coupled to said system memory, wherein said processor comprises:
  a cache memory; and
  a plurality of multithreaded processor cores coupled to said cache memory;
  wherein each of said multithreaded processor cores comprises instruction fetch logic configured to assign a given one of a plurality of threads to a corresponding one of a plurality of thread groups, wherein each of said plurality of thread groups comprises at least two of said plurality of threads, and wherein said instruction fetch logic is further configured to issue a first instruction from one of said plurality of threads during one execution cycle and to issue a second instruction from another one of said plurality of threads during a successive execution; and
  wherein said instruction fetch logic is further configured to reassign said given thread to a different thread group subsequent to assigning said given thread to said corresponding thread group.

43. The system as recited in claim 42, wherein during a given execution cycle, a plurality of instructions from at least two distinct ones of said plurality of threads are concurrently executing in a given multithreaded processor core.

44. The system as recited in claim 42, wherein each multithreaded processor core further comprises a plurality of execution units, and wherein said instruction fetch logic is further configured to issue a given instruction to a given execution unit dependent upon a corresponding thread group of said given instruction.

45. The system as recited in claim 42, wherein said instruction fetch logic is further configured to stall issue of instructions from a first one of said plurality of thread groups while concurrently allowing issue of instructions from a second one of said plurality of thread groups.

46. The system as recited in claim 42, wherein said instruction fetch logic is further configured to stall issue of instructions from a first thread within a given one of said plurality of thread groups while concurrently allowing issue of instructions from a second thread within said given thread group.

47. The processor as recited in claim 16, wherein during at least three consecutive execution cycles, said scheduling logic is configured to respectively issue at least three instructions from at least three different ones of said plurality of threads to ones of said plurality of execution units for execution.

48. The method as recited in claim 23, further comprising during at least three consecutive execution cycles, respectively issuing at least three instructions from at least three different ones of said plurality of threads to ones of said plurality of execution units for execution.

49. The system as recited in claim 30, wherein during at least three consecutive execution cycles, said scheduling logic is configured to respectively issue at least three instructions from at least three different ones of said plurality of threads to ones of said plurality of execution units for execution.

50. The integrated circuit as recited in claim 37, wherein during at least three consecutive execution cycles, said instruction fetch logic is configured to respectively issue at least three instructions from at least three different ones of said plurality of threads to ones of a plurality of execution units for execution.

51. The system as recited in claim 42, wherein during at least three consecutive execution cycles, said instruction fetch logic is configured to respectively issue at least three instructions from at least three different ones of said plurality of threads to ones of a plurality of execution units for execution.

* * * * *